(12) United States Patent
Parrott et al.

(10) Patent No.: US 11,590,624 B2
(45) Date of Patent: Feb. 28, 2023

(54) INTERNAL GRINDING DEVICE FOR PIPES AND WELD JOINTS

(71) Applicant: Saudi Arabian Oil Company, Dhahran (SA)

(72) Inventors: Brian Parrott, Dhahran (SA); Mohamed Abdelkader, Thuwal (SA); Hassane Trigui, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 705 days.

(21) Appl. No.: 16/704,916

(22) Filed: Dec. 5, 2019

(65) Prior Publication Data

US 2021/0170539 A1    Jun. 10, 2021

(51) Int. Cl.
B24B 5/40 (2006.01)

(52) U.S. Cl.
CPC ..................... B24B 5/40 (2013.01)

(58) Field of Classification Search
CPC ................... B24B 5/40; E21B 37/02
See application file for complete search history.

(56) References Cited

U.S. PATENT DOCUMENTS

| | | | |
|---|---|---|---|
| 2,657,506 A * | 11/1953 | Hadley | B24B 5/40 15/104.18 |
| 5,175,964 A * | 1/1993 | Girndt | B24B 5/40 451/178 |
| 5,899,795 A * | 5/1999 | Penza | B24B 5/40 451/61 |
| 6,408,945 B1 * | 6/2002 | Telfer | E21B 37/02 166/311 |
| 2007/0161339 A1 * | 7/2007 | Wentworth | B24B 5/40 451/109 |
| 2008/0264451 A1 * | 10/2008 | Shimamura | B23K 37/02 219/136 |

(Continued)

FOREIGN PATENT DOCUMENTS

| | | |
|---|---|---|
| CN | 201201172 Y | 3/2009 |
| CN | 108188858 A | 6/2018 |

(Continued)

OTHER PUBLICATIONS

International Search Report and Written Opinion in Corresponding PCT Application No. PCT/US2020/063121 dated Apr. 12, 2021. 11 pages.

*Primary Examiner* — Omar Flores Sanchez
(74) *Attorney, Agent, or Firm* — Leason Ellis LLP

(57) ABSTRACT

A method for treating an interior weld joint located along an inner surface of a pipe includes the steps of: (a) advancing an internal grinder device within the pipe to the interior weld joint, wherein the internal grinder device includes a hollow housing that has a first open end and a first grinding implement that is disposed within the hollow housing and coupled thereto with a first biasing member; and (b) controllably rotating the hollow housing to at least a threshold speed at which time and under centrifugal force, the first grinding implement moves from an at rest retracted position to a deployed position in which the first grinding implement extends radially beyond the first open end for contacting and grinding the interior weld joint as the hollow housing and the first grinding implement are rotated.

29 Claims, 8 Drawing Sheets

(56) References Cited

U.S. PATENT DOCUMENTS

| | | | |
|---|---|---|---|
| 2010/0129170 A1* | 5/2010 | Wilmot | B24B 33/02 409/143 |
| 2010/0258293 A1* | 10/2010 | Lynde | E21B 23/00 166/66.4 |
| 2011/0107571 A1* | 5/2011 | Kerdiles | B24B 39/026 29/90.7 |
| 2011/0211928 A1* | 9/2011 | Wilmot | B23Q 15/10 74/25 |
| 2011/0214873 A1* | 9/2011 | Krieg | E21B 37/00 166/174 |
| 2016/0145973 A1* | 5/2016 | Lykkebo | E21B 10/325 166/162 |
| 2016/0230508 A1* | 8/2016 | Jensen | E21B 4/04 |
| 2017/0326704 A1* | 11/2017 | Granlund | B24B 5/40 |
| 2017/0362917 A1* | 12/2017 | Esslemont | E21B 37/02 |
| 2018/0001422 A1* | 1/2018 | Rajagopalan | B23K 26/282 |
| 2019/0022819 A1* | 1/2019 | Jessup | B24B 33/025 |
| 2019/0061091 A1* | 2/2019 | Schmitz | B23K 37/0282 |
| 2021/0154793 A1* | 5/2021 | Höglund | B24B 33/08 |
| 2022/0040745 A1* | 2/2022 | Chu | B24B 5/12 |

FOREIGN PATENT DOCUMENTS

| | | | |
|---|---|---|---|
| FR | 2969943 | A1 | 7/2002 |
| GB | 2160452 | A | 12/1985 |
| JP | H0775951 | A | 3/1995 |
| WO | 2011030119 | A1 | 3/2011 |

* cited by examiner

INTERNAL GRINDING DEVICE FOR PIPES AND WELD JOINTS

TECHNICAL FIELD

The present invention relates to pipeline assembly and more particularly, to a tool (device) that is configured for weld grinding (repair) to reduce or even eliminate weld intrusion and splatter even in the tight confines of smaller diameter pipelines.

BACKGROUND

Metallic pipelines are generally assembled in the field using girth welding techniques. This involves the welding together of abutting pipe ends with the weld bead protruding into the interior of the pipe, filling the entire gap between the abutting ends, and extending to a weld bead head on the outside of the joint around the entire girth of the weld. Sometimes a backing is used to minimize the intrusion of the weld material into the pipe and/or to minimize splatter; however this can be difficult to install and/or use in the field as the pipe segments can be 12 meters or longer. Additionally, the use of a backing does not eliminate the potential for intrusion that exceeds design specifications. As a result, the weld material sometimes intrudes into the interior of the pipe. Such weld intrusion is not desired and complicates the further processing of the weld joint.

In order to properly coat a welded joint like this, the surface must be relatively smooth and the weld must not protrude too far into the inside of the pipe. Thus, in cases where there are issues found with the interior of the weld, and that joint is far removed from the opening of the pipe, the joint is often cut and rewelded, thereby resulting in significant delays or costs.

There is therefore a need and desire to provide a tool (device) that can treat (grind) an interior weld joint that is not easily accessible even in pipes that have very small diameters.

SUMMARY

A device for treating an interior weld joint located along an inner surface of a pipe includes a hub and a grinding mechanism that is rotatably coupled to the hub. The grinding mechanism includes a hollow housing that has a first open end and a first surface modifying tool, such as a first grinding and/or cutting implement, that is disposed within the hollow housing and is coupled thereto with a first biasing member that is coupled between the hollow housing and the first cutting implement. It will be appreciated that the first surface modifying tool is configured to contact and modify a surface such as a grinding tool that contacts the surface for grinding and/or cutting the surface. The first surface modifying tool moves between an at rest retracted position and a deployed position in which the first surface modifying tool extends radially beyond the first open end for contacting and grinding the interior weld joint. The first biasing member is tuned such that centrifugal force resulting from rotation of the first surface modifying tool that is contained in the hollow housing overcomes the spring force and causes the first surface modifying tool to move from the at rest retracted position to the deployed position.

Preferably, the hollow housing further includes a second open end and a second surface modifying tool that is disposed within the hollow housing and is coupled thereto with a second biasing member that is coupled between the hollow housing and the second surface modifying tool. The second surface modifying tool moves between an at rest retracted position and a deployed position in which the second surface modifying tool extends radially beyond the second open end for contacting and grinding the interior weld joint. The second biasing member is tuned such that centrifugal force resulting from rotation of the second surface modifying tool within the hollow housing overcomes the spring force and causes the second cutting implement to move from the at rest retracted position to the deployed position.

It will be appreciated that the first surface modifying tool and the second surface modifying tool can be of the same type as illustrated; however, it is also possible that there can be a difference between the two tools.

The exposed edges of the first and second surface modifying tools can be in the form of beveled cutting edges or an abrasive surface. Either construction allows the interior weld joint to be ground by the first and second surface modifying tools and unlike conventional devices, the construction of the present device allows such work to be performed in smaller diameter pipes.

In one aspect, a method for treating an interior weld joint located along an inner surface of a pipe includes the steps of:
  advancing an internal grinder device within the pipe to the interior weld joint, wherein the internal grinder device includes a hollow housing that has a first open end and a first surface modifying tool that is disposed within the hollow housing and coupled thereto with a first biasing member; and
  controllably rotating the hollow housing to at least a threshold speed at which time the first surface modifying tool moves, under centrifugal force, from an at rest retracted position to a deployed position in which the first surface modifying tool extends radially beyond the first open end for contacting and grinding the interior weld joint as the hollow housing is rotated.

BRIEF DESCRIPTION OF THE DRAWING FIGURES

DETAILED DESCRIPTION OF CERTAIN EMBODIMENTS

Figure 1:
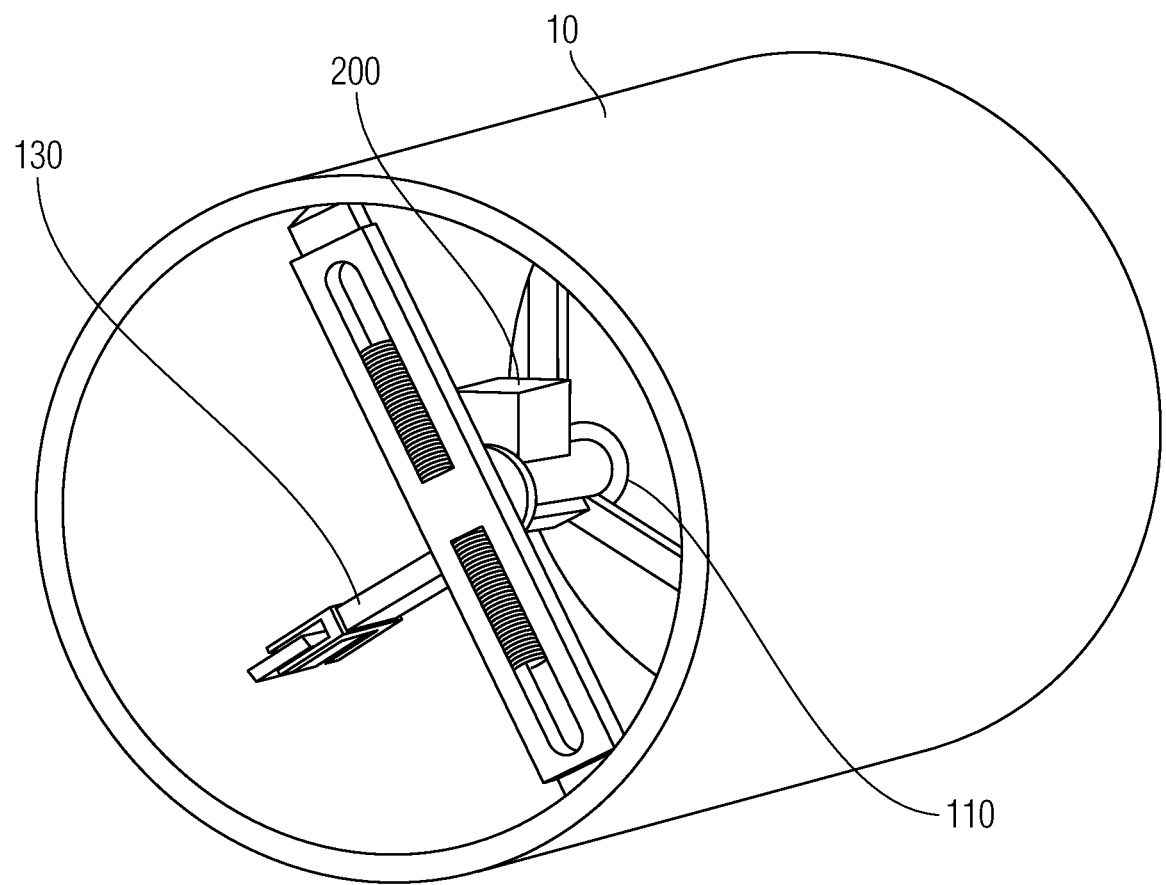
FIG. 1 is a perspective view of a device for grinding an interior weld joint being shown disposed within a pipe with surface modifying tools (grinding implements) being in deployed positions.
Figure 2:
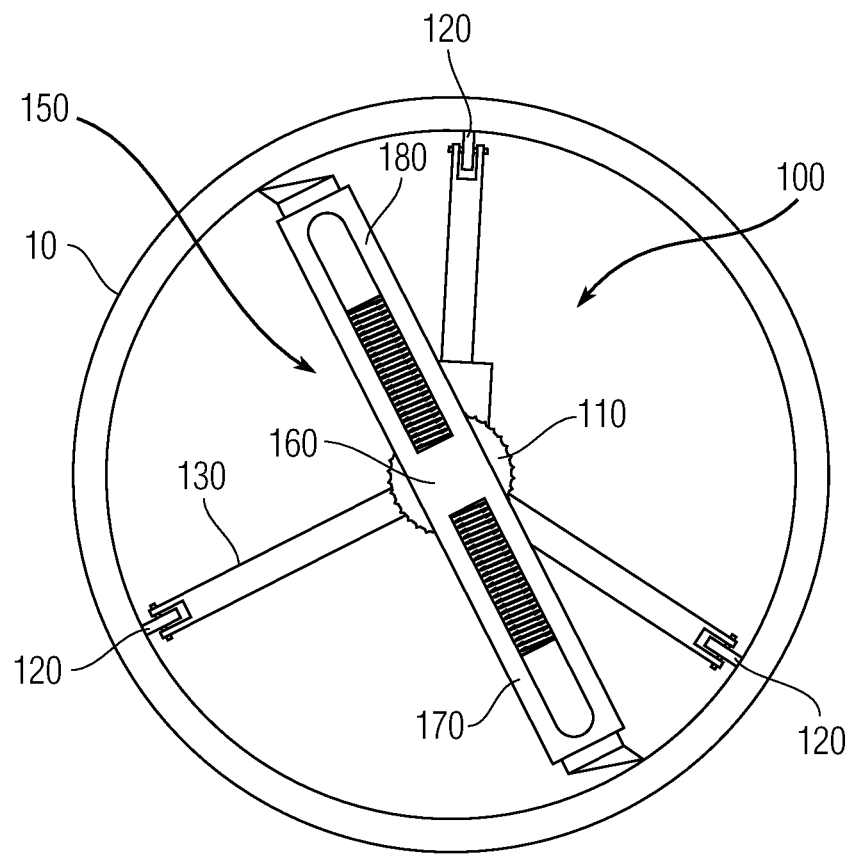
FIG. 2 is front elevation view of the device within the pipe with the surface modifying tools being in the deployed positions.
Figure 3:
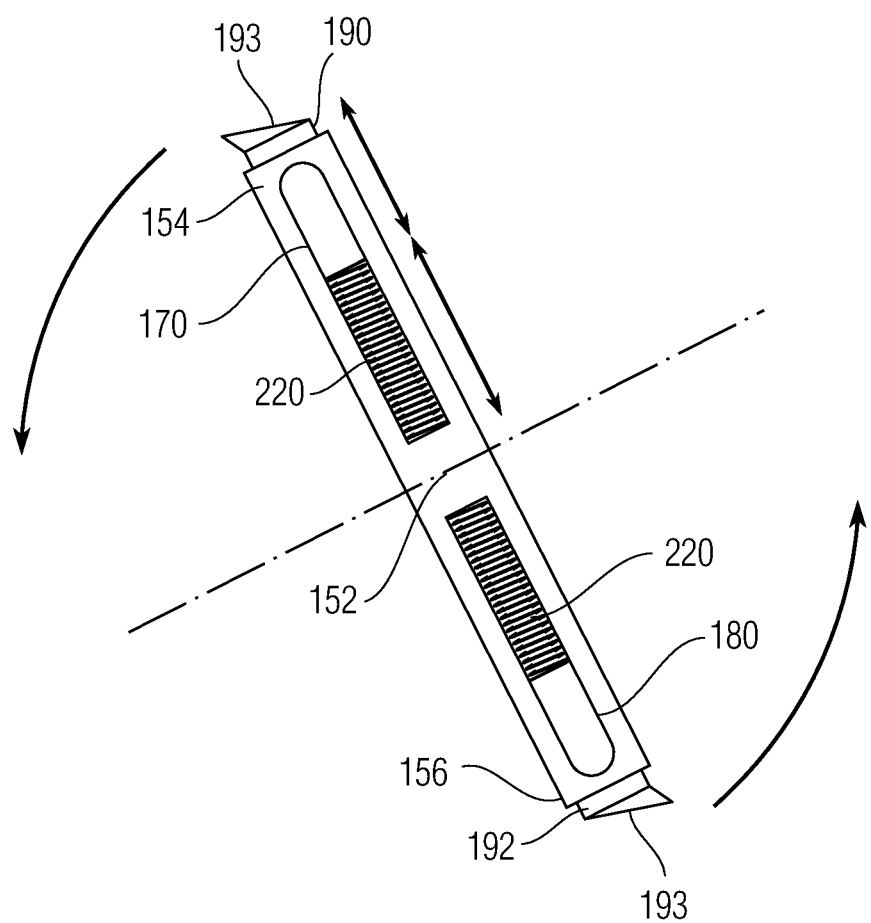
FIG. 3 is a front elevation view of a rotatable housing containing the surface modifying tools which are shown in the deployed positions.
Figure 4:
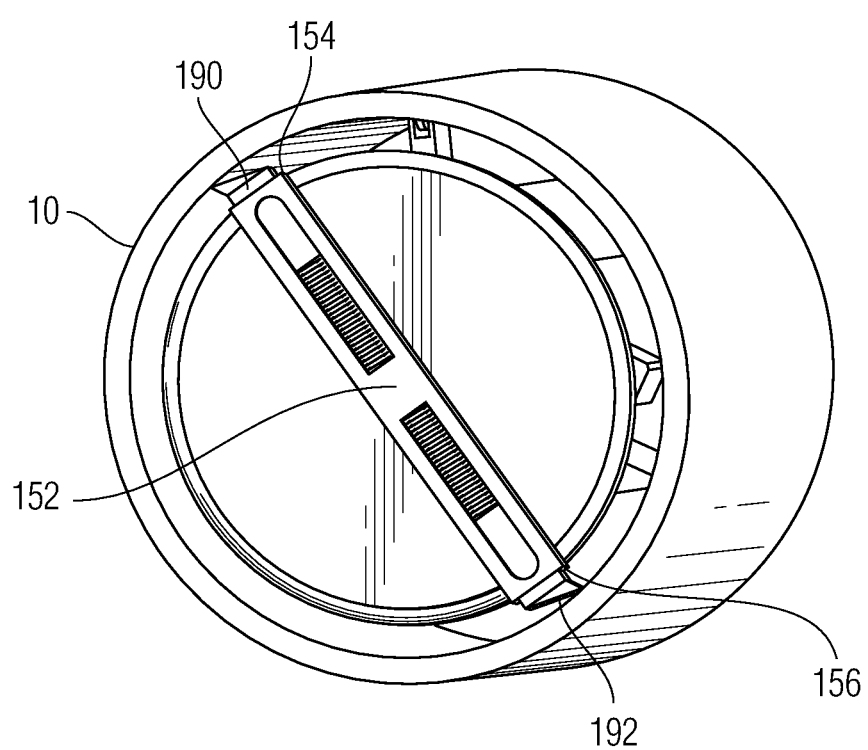
FIG. 4 is a front perspective view of the device contained within the pipe along with an optional vacuum module.
Figure 5:
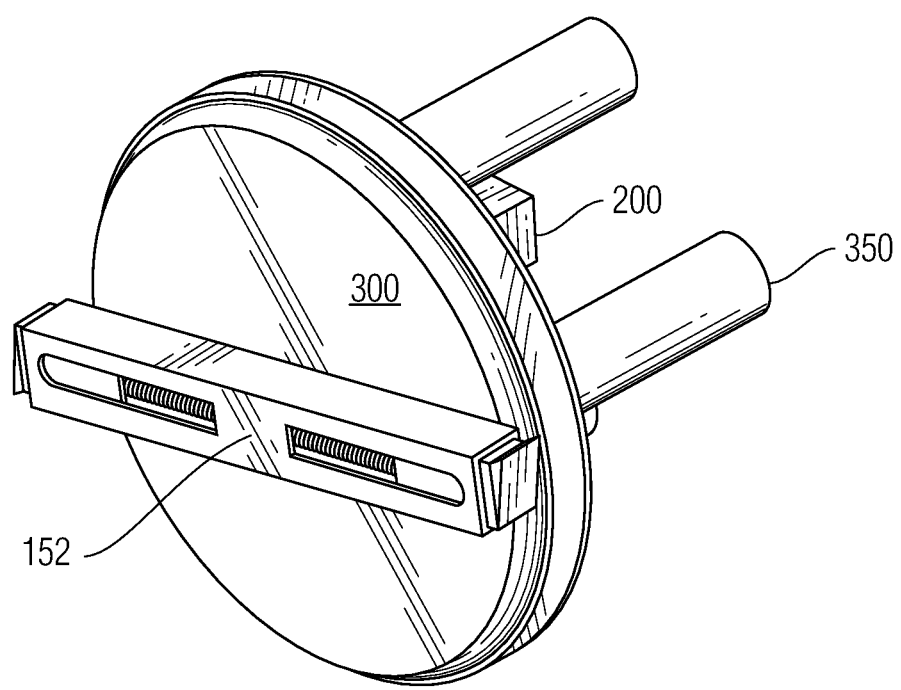
FIG. 5 is a front and side perspective view of the device along with the optional vacuum module.
Figure 6:
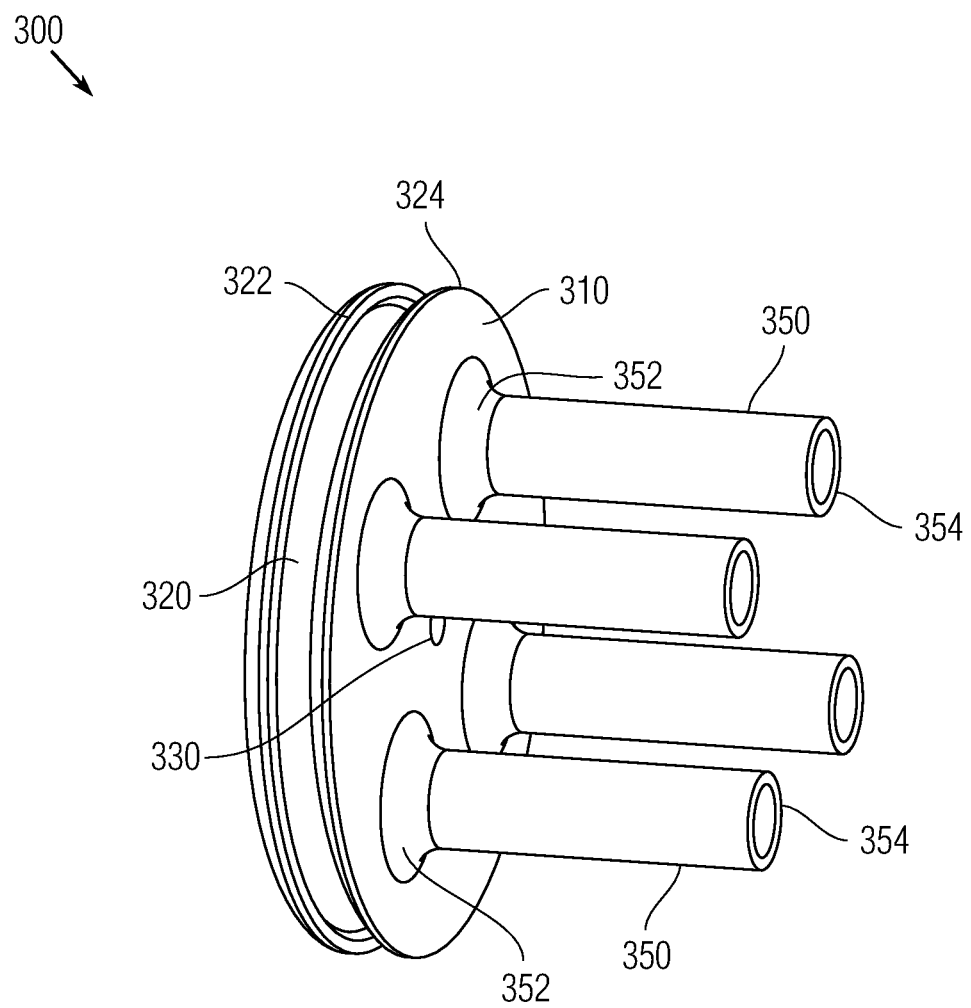
FIG. 6 is a side perspective view of the optional vacuum module.
Figure 7:
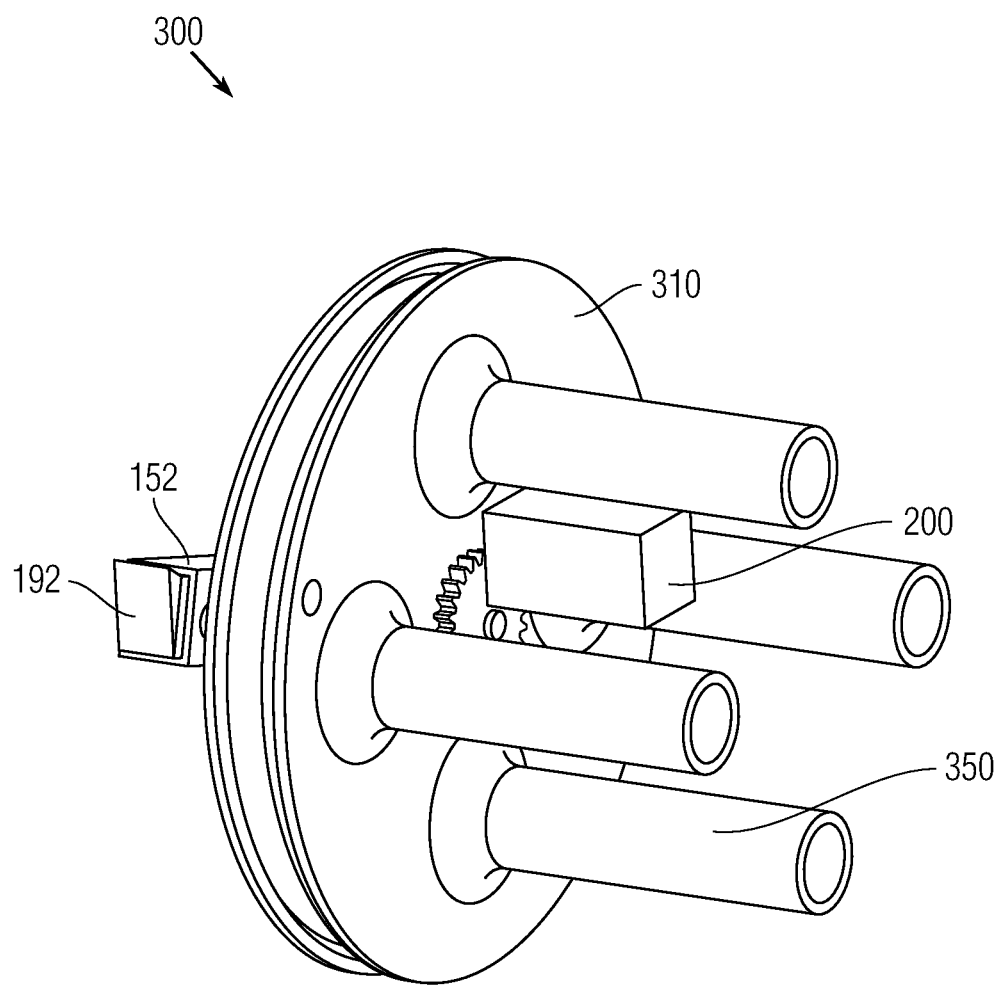
FIG. 7 is a side perspective view of the device with the optional vacuum module.

Metallic pipelines are generally assembled in the field using welding techniques. This involves the welding together of abutting pipe ends with the weld bead protruding into the interior of the pipe, thereby filling the entire gap between the abutting ends, and extending to a weld bead head on the outside of the joint around the entire girth of the weld. Sometimes a backing is used to minimize the intrusion of the weld material into the pipe and/or to minimize splatter. However, this can be difficult to install and/or use in the field as the pipe segments can be 12 meters or longer. As a result, welds sometimes intrude into the interior of the pipe.

As discussed herein, such intrusion complicates the pipe assembly process. More particularly, in order to properly coat a welded joint like the one described above, the inner surface must be relatively smooth and the weld must not protrude too far into the inside of the pipe. Thus, in cases in which there are issues found with the interior (portion) of the weld, the joint is very often cut and rewelded resulting in increases expense and time needed to complete the assembly process.

FIGS. 1-7 illustrate one exemplary device 100 that can perform one or more operations that are part of a treatment process for treating an interior weld joint located along an inner surface of a pipe 10, even in pipes that have very small diameters. The device 100 is thus a simple and efficient tool that can perform the necessary weld grinding (pipe repair) to reduce or even eliminate weld intrusion and splatter even in the tight confines of small diameter pipelines. The device 100 can be considered to be a robotic tool that can be advanced within the pipe 10 and then controlled to perform various operations inside the pipe 10.

As mentioned previously, the traditional welding systems that are typically used allow for good material removal using rotating metal disks that are often inexpensive and replaceable allowing for low operating costs and effective material removal. However, in small diameter pipelines, it is very difficult to mount a disk in the appropriate orientation to effectively grind the weld joint, especially considering that a motor and potentially complex deployment system needs also to be fitted for such application. A centrally located disk without a deployment/offsetting mechanism could result in scraping coatings on the pipe and therefore, such a solution is not ideal.

In contrast, the device 100 of the present disclosure overcomes these deficiencies and as described herein, can be mounted in the same plane as the weld and is configured to then be actuated without the need for a deployment system.

The device 100 is thus a tool that is configured to be disposed and travel within the inside of the pipeline 10, which typically has a circular shape as shown. The device 100 includes a center hub 110 that has a travel mechanism that allows the device 100 to controllably travel internally within the pipe 10 along a length of the pipe 10. More particularly, the device 100 includes a plurality of traveler (passive or driven) wheels 120 that ride along an inner surface 12 of the pipe 10. As shown, the plurality of traveler wheels 120 can comprise three traveler wheels 120. Each of the traveler wheels 120 rotates independent from the others and seats directly against the inner surface 12. The traveler wheels 120 are arranged at distal ends of corresponding spokes 130. Thus, in the illustrated embodiment, there are three spokes 130 that can be spaced uniformly apart (i.e., 120 degrees) from one another. The spokes 130 are thus in the form of elongated shafts that extend radially outward from the center hub 110. At the distal end of each spoke 130 there are a pair of fingers with an open space formed therebetween that receives one traveler wheel 120. A pin or axle extends between the fingers and through the center of the traveler wheel 120 and defies an axis of rotation of the traveler wheel 120.

The spokes 130 can be attached to the hub 110 between the two ends of thereof and as illustrated, the spokes 130 can be located closer to one of the ends of the hub 110.

In one implementation, the spokes 130 can pivot and be locked in a number of different settings which permit the diameter of the wheel assembly to be altered. This allows the wheel assembly to be used in different diameter pipes. Much like a three-legged tripod, the spokes 130 can be extended to a particular setting based on the inner diameter of the pipe 10. This allows the wheel assembly to be used with different sized grinder mechanisms as described below.

It will be appreciated that in one implementation, the traveler wheels 120 are passive and are not actively driven; however, in another implementation, the traveler wheels 120 are actively driven by a drive, such as a motor or the like. More specifically, at least one of the traveler wheels 120 can be actively driven using a motor or the like, while the other wheels 120 can be passive. Alternatively, the entire device 100 can be driven, as by a drive device, such that the entire device 100 is driven longitudinally within the inside of the pipe 10. It will be understood that the device 100 can also be either pushed by another device or can be pulled by another device to the target location.

It will also be appreciated that wired or wireless control over the device 100 can be provided. When wireless, the device 100 can include a communications module that is configured to communicate with a remote device, such as a server or remote device, such as a computer device. In this manner, the drive action of the device 100 can be controlled. There can also be a visualization aspect, such as one or more cameras, that provide for visualization of the inside of the pipe 10 to allow for the device 100 to be driven to the proper, target site at which one or more operations are to be performed, such as a weld joint.

It will be appreciated that the device 100 can be constructed to have two traveler wheels 120 arranged 180 degrees apart or it can include more than four traveler wheels 120, such as four traveler wheels arranged 90 degrees apart.

The center hub 110 can have a cylindrical shape; however, other shapes are equally possible.

The device 100 also includes a grinding (surface modification) mechanism 150 that is configured to grind, cut or otherwise surface modify a weld joint inside the pipe 10 (while the mechanism is typically grinds the surface, the mechanism may also involve cutting or other surface modification). The grinding mechanism 150 is operatively coupled to a motor 200 that allows for the controlled movement of the grinding mechanism 150 and more particularly, the controlled rotation of the grinding mechanism 150. As understood, a rotatable drive shaft can be connected between the motor 200 and the grinding mechanism 150 and more particularly, the drive shaft is fixedly attached at one end to the grinding mechanism 150 with the other end being coupled to the motor, as by a geared type arrangement, such that the driven shaft is driven in a rotational manner by the motor. The grinding mechanism 150 can include an elongated arm structure 160 that can be considered to have a first arm portion 170 and a second arm portion 180 both of which extend radially outward from the center hub 110. In the illustrated embodiment, the grinding mechanism 150 is disposed at one end of the center hub 110 and spaced from the traveler wheels 120. In other words, the grinding mechanism 150 can be located at one end of the center hub 110 and the traveler wheels 120 at or near the opposite end of the center hub 110. As mentioned below, the first arm portion 170 and the second arm portion 180 preferably have identical lengths (i.e., the length of the housing 152 in one direction from the center point of the rotation is the same length as in the opposite direction).

It will be appreciated that the first arm portion 170 and the second arm portion 180 preferably have identical lengths so as to effectively balance the housing 152. In other words, the housing 152 and the arrangement of the two surface modifying tools are symmetric in form and balanced so that as the housing 152 rotates, the two surface modifying tools rotate and centrifugal forces acting on the two surface modifying tools causes like movement of the two surface modifying tools in opposite outward directions. In other words, much like a propeller, the housing 152 and the two surface modifying tools are properly balanced to allow for proper and efficient movement and also permits the two surface modifying tools to move smoothly within the housing 152 since the two surface modifying tools are intended to contact and operate on the pipe surface at the same time. This arrangement and configuration results in automatic balancing of the rotating housing and rotating first and second surface modifying tools which is a desired property.

The motor 200 can be located along the exterior of the center hub 110 as a separate part that is coupled to the center hub or the motor 200 can be disposed internally within the center hub 110.

In one aspect, the speed of the motor 200 can be adjusted to balance the torque during the surface modification (grinding) process. For example, the motor 200 can be accelerated until the motor 200 reaches a certain current draw (torque) and then a simple control loop can be used to accelerate (or decelerate) to increase (or decrease) the torque as the weld is ground in order to maintain a relatively constant torque that is optimal for the motor/grinding efficiency. In one implementation, the grinding mechanism 150 includes a housing 152 that has a first end 154 and an opposite second end 156. The housing 152 can be a hollow structure and in particular, the first arm portion 170 includes a first track and the second arm portion 180 includes a second track that extends in an opposite direction as the first track. As shown, the first arm portion 170 and the second arm portion 180 can be linear with the two portions 170, 180 being oriented 180 degrees apart. The housing 152 can contain one or more windows that provide access to the inside of the housing 152. For example, each of the first arm portion 170 and the second arm portion 180 can include one or more windows (openings).

While discussed as being two arm portions, it will be appreciated that the housing 152 can be a single elongated structure that is rotatably mounted to the center hub 110 at one end thereof. In this sense, an arm can be considered to be a linear portion of the housing 152 that contains a cutting (grinding) implement. As a result, it will be appreciated that more than two arms can be provided and in the event of three arms, the arms can be oriented 120 degrees apart much like the orientation of the three traveler wheels. The more arms, the more cutting implements. It should be noted that there are a number of tradeoffs to be considered. More arm portions provide the potential for faster surface modification, such as faster grinding, cutting and/or more material removal before they all need to be removed. However, more surface modifying tools (e.g., grinding or cutting implements) will also increase the torque requirement and thus the mechanical power required of the motor and gear train, potentially increasing its size as well as the electrical power necessary to drive them.

In some sense, the housing 152 has the resemblance of a propeller at the end of the center hub 110 that is controllably rotated (at a prescribed speed) due to the motor 200. The housing 152 can come in any number of different cross-sectional shapes. For example, the cross-sectional shape of the housing 152 can be a square as shown in the figures; however, other shapes are equally possible.

Within the first arm portion 170 there is a first surface modifying tool 190, such as a first grinding or cutting implement and within the second portion 180 there is a second surface modifying tool 192, such as a second grinding or cutting implement 192. The two surface modifying tools 190, 192 are thus located at opposite ends of the housing 152 and are configured to ride within the inside tracks defined by the first arm portion 170 and the second arm portion 180. Each of the first surface modifying tool 190 and the second surface modifying tool 192 can have in the form of a block or the like that rides linearly within housing 152 in opposite directions relative to one another. An outer exposed edge 193 of the block is in the form of a beveled, sharp grinding and/or cutting edge. This grinding edge 193 is configured to contact and grind the weld joint during operating of the device 100. The grinding edge 192 can be made of a specific high-hardness material such as tungsten carbide or similar as known in the art.

While described the first and second surface modifying tools 190, 192 are described in one embodiment as being sharp cutting implements, the first and second surface modifying tools 190, 192 can take other forms besides cutting edges. For example, the first and second surface modifying tools 190, 192 can comprise abrasive implements (tools) formed of an abrasive material at least at the exposed ends thereof. Such abrasive materials, commonly used on grinding wheels, serve to grind the weld joint when this material is placed in contact with the weld joint and rotated at high speeds. When the first and second surface modifying tools 190, 192 contain such abrasive material, the exposed distal ends thereof typically would not have to have the beveled cutting edge shown in the figures but instead, the exposed distal ends can be rounded (arcuate or convex) in nature.

It will be appreciated that the first and second surface modifying tools 190, 192 are movably disposed within and coupled to the housing 152 so that each moves between an extended position in which the beveled, sharp grinding or cutting edge 193 extends beyond the end of the housing 152 and therefore is capable of contacting the inside of the pipe 10 and thus when the housing 152 is controllably rotated, the sharp grinding or cutting edge 193 travels along an inner circumference of the pipe 10 at the location at which the housing 152 is located.

Since it is not desired for the beveled grinding or cutting edges 193 to be in contact with the inside of the pipe 10 as the device 100 travels within the pipe 10 (in a longitudinal direction), the first and second surface modifying tools 190, 192 are configured to retract within the housing 152. More specifically, each of the first and second surface modifying tools 190, 192 is coupled to a biasing element 220 (i.e., a spring) that applies a force to the respective first and second surface modifying tools 190, 192 in an inward direction toward the center hub 110. A first end of the spring 220 is attached to an inner part (e.g., center point) of the housing 152, while a second end of the spring 220 is attached to an inner part of the first and second surface modifying tools 190, 192. The spring 220 can be any number of suitable springs including but not limited to a coiled spring. In addition, it will be appreciated that the element 220 can generally be formed as a structure that is formed of a suitable elastic material which is configured to perform in the intended manner in that once the housing and the surface modifying tools begin to rotate, the surface modifying tools being to move radially outward due to centrifugal force and the elastic structure deforms and initially easily extends; however, the elastic structure then reaches a point at which further extension and elongation are resisted.

Thus, in a rest position, the biasing elements 200 pull the first and second surface modifying tools 190, 192 in an inward directed toward the center of the housing 152 (e.g., toward the center hub 110). In this rest position, the biasing elements 200 are thus in a normal relaxed state and no energy is being stored. The biasing elements 200 are configured such that during rotation of the housing 152, centrifugal force acts on the first and second surface modifying tools 190, 192 (due to the weight of the first and second surface modifying tools 190, 192) and the spinning (rotation) of the housing 152 about a single axis of rotation much like a propeller. As the housing 152 rotates at faster speeds (rpms), and reaches a threshold speed (rpm), the mass of the first and second surface modifying tools 190, 192 results in centrifugal force acting on the first and second surface modifying tools 190, 192 causing them to be pulled in an outward direction to the deployed positions. This spinning movement of the housing 152 and the respective outward motions of the first and second surface modifying tools 190, 192 causes each of the biasing elements 200 to extend (elongate) in an outward direction so as to protrude beyond the two opposing ends of the housing 152. This movement in a radially outward direction places the first and second surface modifying tools 190, 192 in the extended (cutting) positions whereby they are driven into the inside of the pipe 10. The continued rotation (spinning) of the housing 152 causes the first and second surface modifying tools 190, 192 to circumscribe the inner surface of the pipe 10.

Thus, when the device 100 and more particularly, the housing 152 and the first and second surface modifying tools 190, 192 contained therein, are placed at the inner surface of the weld joint. The rotation of the first and second surface modifying tools 190, 192 causes this exposed inner surface of the weld joint to be exposed to the rotating first and second surface modifying tools 190, 192 resulting in the grinding of this exposed inner surface of the weld joint. Continued rotation of the first and second surface modifying tools 190, 192 causes any undesired inner weld joint material to be ground down from the weld joint. In this manner, the grinding mechanism 150 is a fully automated system in that rotation of the housing 152 as by the motor 200 automatically causes the deployment of the first and second surface modifying tools 190, 192. Unlike the traditional systems, the device 100 can be mounted in the same plane as the weld joint and is actuated without the need for a deployment mechanism and therefore, the device 100 finds particular utility in a wide number of settings especially pipe grinding operations in small diameter pipelines.

Control Over Grinding Operation

The device 100 can include a number of features that are designed to control the grinding operation. For example, a locking mechanism can be employed to prevent over-reach of the grinding tools (e.g., first and second surface modifying tools 190, 192). For example, within the housing (within one arm thereof) there can be a first lock element that engages and mates to a second lock element that forms part of the block that defines the first and second surface modifying tools 190, 192. This can be as simple as a stop mechanism in which the block includes a protrusion that rides within a slot formed in the arm and when it reaches the end of the track, the block is prevented from any additional movement in the radial outward direction. The location of the stop is calculated based on a number of parameters, such as the spring characteristics, the dimensions of the block, etc. Similarly, the springs (biasing elements) associated with each of the first and second surface modifying tools 190, 192 can be tuned to extend through a range needed to grind, cut or otherwise act on the weld joint as the housing 152 is accelerated. In other words, tuning of the spring allows for the grind depth to be controlled.

In yet another aspect, the base (proximal end) of the biasing element (e.g., spring) can be adjusted based on the size of the pipe 10. This can be achieved by having a lockable sliding element to which the inner end of the biasing element is attached that would be tightened in the desired location. Markings on the housing 152 can help the user to affix such locking element in the correct location. It will also be appreciated that this feature can also be associated and related to an actuator, such as the one described below, to allow the actuator to move this element.

The first and second surface modifying tools 190, 192 are also shaped in the direction of cutting to create a desired profile. From side-to-side, the surface modifying tools are constructed such that the device (robot) 100 can approach the weld and grind, cut or otherwise modify the pipe surface with the leading edge first.

Actuator

In another implementation, the device 100 can include an actuator 101 that is configured to control the extension of the first and second surface modifying tools 190, 192. In other words, operation of the actuator causes the first and second surface modifying tools 190, 192 to be extended a prescribed distance from the ends of the arm, thereby allowing control over the precise amount of the first and second surface modifying tools 190, 192 that are exposed. Any number of different types of actuators can be used so long as they are suitable for the intended application. For example, the actuator can be an electromechanical actuator, such as a solenoid; a pneumatic actuator; etc. The actuator is operatively connected to a controller, such as controller 105 (FIG. 8) that can be a remote controller connected to the device 100 via one or more wires or it can be of a wireless nature in that the controller is on-board the device 100 and a communications module serves to transmit and receive command signals (instructions) from a remote location, thereby allowing the user to control the device 100 by a computing device at a remote location (via wireless communications).

In addition, the deployed surface modifying tools 190, 192 can be configured to retract once the centrifugal force is removed and/or retraction of the surface modifying tools 190, 192 can be assisted by use of an applied vacuum that serves to pull the surface modifying tools 190, 192 inward into the housing 152. Such applied force ensures that the surface modifying tools 190, 192 fully retract.

Optional Sensors

The device 100 can include one or more optional sensors for monitoring and/or controlling the grinding operation.

Figure 8:
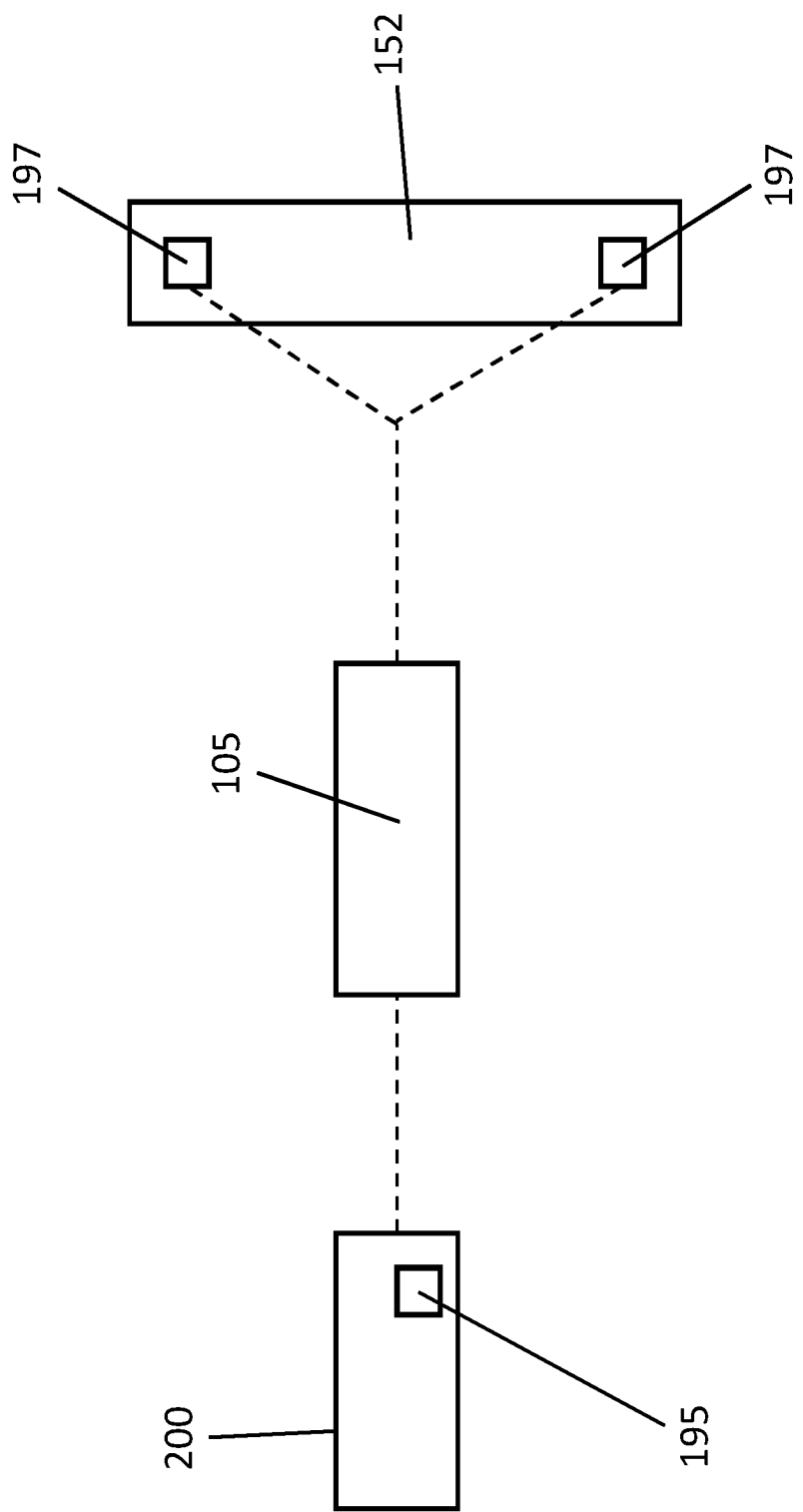
FIG. 8 is a diagram showing optional sensors of the device.

For example as shown in FIG. 8, a current sensor 195 can be provided as part of the motor assembly for monitoring resistance within the motor. As would be expected, during the grinding action, the motor is placed under increased load and increased resistance can be detected. In addition, a pressure sensor 197 can be disposed on the side of the surface modifying tool (first and second surface modifying tools 190, 192) to measure resistance. A master controller 105 is in communication with both sensors 195, 197 and receives feedback (measurements) from each sensor and in the event that a condition outside an acceptable range of values is observed, the controller 105 can power down the motor 200 or take other action. For example, a position sensor (e.g., a resistive sensor) can be used to detect the position of the surface modifying tool 190, 192 (grinding or cutting block) in the housing 152.

Optional Vacuum Module

To complement the grinding action, the device 100 can include an optional vacuum module 300 that is configured to remove any grinding by-product material that is generated during the grinding action. In other words, the vacuum module 300 is configured to collect debris generated during the grinding process.

FIGS. 4-7 show one exemplary vacuum module 300. The vacuum module 300 is configured to be coupled to the device 100 and is configured to clean and remove the weld remains during the grinding process. The vacuum module 300 has a main housing or body 310 that is configured to be received within the inside of the pipe 10. The vacuum module 300 can thus have a circular shape due to the circular shape of the pipe 10. Along a peripheral edge of the vacuum module 300, a vacuum slot 320 is formed. The vacuum slot 320 is thus recessed relative to a front edge wall 322 that defines a front face of the body 310 and a rear edge wall 324 that defines a rear face of the body 310. The vacuum slot 320 is thus a circular shaped slot.

A through hole or opening 330 is formed through the body 310 and can be centrally located within the body 310. This opening 330 allows for passage of the central hub and/or the drive shaft that connects the motor 200 to the housing 152 and allows for placement of the grinding mechanism 150 along the front face of the body 310 and placement of the motor 200 along the rear face of the body 310.

The body 310 is configured such that when placed within the pipe 10, the vacuum slot 320 is placed in close proximity to the inner surface of the pipe 10 and thus, a small annular shaped gap or space is present in which the weld remain (debris) can enter the vacuum slot 320. As shown, a diameter of the housing 152 can be the same or similar to the diameter of the body 310; however, when the first and second surface modifying tools 190, 192 radially extend from the ends of the housing 152, the surface modifying tools 190, 192 extend beyond the peripheral edge of the body 310.

The body 310 can thus be a hollow structure (that defines a fluid collection chamber) that is in fluid communication with the vacuum slot 320 such that when negative pressure (suction) is applied to the vacuum slot 320, the weld remains are drawn into the vacuum slot 320. To route the weld remains away from the vacuum module 300, one or more conduits 350 are provided. Each vacuum conduit 350 is in fluid communication with the vacuum slot 320 by way of the hollow interior of the body 310. For example, the conduit 350 has a first end 352 that is in fluid communication with the hollow interior of the body 310 and an opposing second end 354 that can be a free end. The second end 354 of each conduit 310 is placed in fluid communication, as by tubing, with a source of negative pressure (a vacuum).

The conduits 350 can be in the form of vacuum tubes that extend rearwardly from the rear face of the vacuum body 310. As illustrated in the figures, the conduits 350 can be spaced along the rear face of the vacuum body 310. For example, there can be four (4) vacuum tubes 350 that are spaced along the rear face of the vacuum body 310 with the opening 330 being centrally located between the vacuum tubes 350. Since the vacuum module 300 is coupled to the device 100, it is carried thereby and thus, as the device 100 is advanced in a forward and rearward direction within the pipe 10, the vacuum module 300 similarly travels within the pipe 10. The vacuum tubes 350 are also arranged such that the traveler wheels 120 are accommodated as well in that the spokes 130 can pass between the vacuum tubes 350. Alternative constructions are possible in that the lengths of the vacuum tubes 350 can be such that the spokes 130 and traveler wheels 120 are positioned rearward of the vacuum tubes 350.

As shown, the vacuum module 300 can be configured to be disposed on one side of the device 100 (e.g., along the rear face of the device); however, in an alternative embodiment, the vacuum module 300 can be configured such that it extends around the grinding tool (device 100) to provide an enclosed working space with suction to remove debris. In such design, the far side of the device could rotate along with the device 100 (grinding tool) in order to simplify the transfer of torque to the grinding tool.

In addition, brushes can be employed to create a flexible seal to provide increased vacuum capability while still allowing particles to be collected via suction.

Operation of the vacuum module 300 thus allows the weld remains, such as particles and/or shavings, to be captured and removed from the treatment site.

It will also be understood that the motor and advancement of the device 100 can be controlled at a remote location using either a wired connection or a wireless connection. The control over the motor allows a rotation speed of the grinder (hollow housing with cutting implements) to be controlled so as to reach at least a threshold speed that is one which allows deployment of the cutting implements.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for treating an interior weld joint located along an inner surface of a pipe comprising:
   a hub; and
   a surface modification mechanism that is rotatably coupled to the hub and includes a hollow housing that has a first open end and a first surface modifying tool that is disposed within the hollow housing and is coupled thereto with a first biasing member that is coupled between the hollow housing and the first surface modifying tool, the first surface modifying tool moving between an at rest retracted position and a deployed position in which the first surface modifying tool extends radially beyond the first open end for contacting and grinding the interior weld joint, wherein the first biasing member being tuned such that rotation of the housing is translated to rotation of the first surface modifying tool and centrifugal force resulting from rotation of the first surface modifying tool causes the first surface modifying tool to move from the at rest retracted position to the deployed position.

2. The device of claim 1, wherein the hollow housing further includes a second open end and a second surface modifying tool that is disposed within the hollow housing and is coupled thereto with a second biasing member that is coupled between the hollow housing and the second surface modifying tool, the second surface modifying tool moving between an at rest retracted position and a deployed position in which the second surface modifying tool extends radially beyond the second open end for contacting and grinding the interior weld joint, wherein the second biasing member being tuned such that rotation of the housing is translated to rotation of the second surface modifying tool and centrifugal force resulting from rotation of the second surface modifying tool causes the second surface modifying tool to move from the at rest retracted position to the deployed position.

3. The device of claim 2, wherein the housing has a first portion that extends outward in a first direction from a center point of rotation of the housing and a second portion that extends outward in an opposite second direction from the center point, the first surface modifying tool being disposed within the first portion and the second surface modifying tool being disposed within the second portion, wherein the first portion and the second portion have at least substantially identical lengths.

4. The device of claim 1, wherein the first surface modifying tool has one of a beveled cutting edge and an exposed abrasive surface.

5. The device of claim 1, wherein the first surface modifying tool slides axially within the hollow housing in a direction away from a center point as the first surface modifying tool moves to the deployed position.

6. The device of claim 1, further including a motor that is disposed along the hub and includes a drive shaft to which the housing of the surface modification mechanism is attached via a geared coupling for controllably rotating the housing to deploy the first surface modifying tool.

7. The device of claim 1, further including a wheel assembly for engaging the inner surface of the pipe and configured to allow the device to travel within the pipe, the wheel assembly being coupled to the hub.

8. The device of claim 7, wherein the wheel assembly includes a first spoke fixedly coupled at a first end to the hub and having a first wheel at a second end; and a second spoke fixedly coupled at a first end to the hub and having a second wheel at a second end.

9. The device of claim 8, wherein the wheel assembly further includes a third spoke fixedly coupled at a first end to the hub and having a third wheel at a second end.

10. The device of claim 8, wherein the wheel assembly is coupled to a rear end of the hub with the surface modification mechanism being coupled to a front end of the hub.

11. The device of claim 1, wherein the first surface modifying tool has a first block body with a grinding and/or cutting edge, the first block body axially travelling within the hollow housing.

12. The device of claim 1, further including a vacuum module that is coupled to the hub and is configured to generate negative pressure along the inner surface of the pipe for collecting weld debris that results from grinding the interior weld joint.

13. The device of claim 12, wherein the vacuum module includes a hollow body that has a vacuum slot formed therein and open along a peripheral edge thereof and one or more vacuum tubes in fluid communication with the hollow body and adapted for connection to a vacuum source.

14. The device of claim 13, wherein the hollow body has a circular shape and the vacuum slot has an annular shape and the one or more vacuum tubes extend rearwardly from a rear face of the hollow body.

15. The device of claim 13, wherein the hollow body and a through hole for accommodating a drive shaft that extends between the housing of the grinding mechanism and a motor that is coupled to the hub.

16. The device of claim 12, wherein the vacuum module is disposed rearward of the housing of the grinding mechanism.

17. A device for treating an interior weld joint located along an inner surface of a pipe comprising:
a hub; and
a surface modification mechanism that is rotatably coupled to the hub and includes a hollow housing, a first surface modifying tool that is disposed within the hollow housing within a first portion thereof, and a second surface modifying tool that is disposed within a second portion of the hollow housing that is opposite the first portion, the first surface modifying tool being coupled to the hollow housing with a first biasing member that is coupled between the hollow housing and the first surface modifying tool, the second surface modifying tool being coupled to the hollow housing with a second biasing member that is coupled between the hollow housing and the second surface modifying tool, each of the first surface modifying tool and the second surface modifying tool moving between an at rest retracted position and a deployed position in which each of the first surface modifying tool and the second surface modifying tool extends radially beyond a respective end of the hollow housing for contacting and grinding the interior weld joint, wherein the first and second biasing members are tuned such that rotation of the housing is translated to rotation of each of the first surface modifying tool and the second surface modifying tool and centrifugal force resulting from rotation of the first and second surface modifying tools causes the each of the first and second surface modifying tools to move from the at rest retracted position to the deployed position.

18. The device of claim 17, wherein the first portion of the housing extends from a center rotation point to a first open end of the housing and the second portion extends from the center rotation point to an opposite second open end of the housing, the first portion and the second portion having the same lengths so that the housing, including the first and second surface modifying tools contained therein, is balanced, thereby causing the first and second surface modifying tools to contact the interior weld joint at least at substantially the same time.

19. The device of claim 17, wherein the first surface modifying tool comprises a first grinding block having an exposed grinding edge and the second surface modifying tool comprises a second grinding block having an exposed grinding edge, the first grinding block moving axially within the first portion and the second grinding block moving axially within the second portion.

20. A method for treating an interior weld joint located along an inner surface of a pipe comprising the steps of:
advancing an internal grinder device within the pipe to the interior weld joint, wherein the internal grinder device includes a hollow housing that has a first portion terminating in a first open end and a first grinding implement that is disposed within the first portion of the hollow housing and coupled thereto with a first biasing member; and controllably rotating the hollow housing to at least a threshold speed at which time and under centrifugal force, the first grinding implement moves from an at rest retracted position to a deployed position in which the first grinding implement extends radially beyond the first open end for contacting and grinding the interior weld joint as the hollow housing and the first grinding implement are rotated.

21. The method of claim 20, further including the step of:

retracting the first grinding implement by reducing a speed of rotation of the hollow housing below the threshold speed or by stopping the rotation of the hollow housing, whereby the first biasing member pulls the first grinding implement into the hollow housing.

22. The method of claim 20, wherein the hollow housing further includes a second portion that terminates in a second open end and is opposite the first portion and a second grinding implement that is disposed within the second portion of the hollow housing and is coupled thereto with a second biasing member such that rotation of the hollow housing to at least the threshold speed causes the second grinding implement to move from an at rest retracted position to a deployed position in which the second cutting implement extends radially beyond the second open end for contacting and grinding the interior weld joint.

23. The method of claim 20, further including the step of applying a vacuum at or proximate to the interior weld joint as the interior weld joint is ground by rotation of the hollow housing and contact between the first grinding implement and the interior weld joint.

24. The method of claim 23, wherein the vacuum is applied by a vacuum module that is located rearward from the hollow housing and in close proximity thereto, the hollow housing being operatively coupled to a drive shaft that is powered by a motor through a geared coupling, the drive shaft passing through an opening formed through the vacuum module.

25. The method of claim 24, wherein the motor is coupled to a hub, the hollow housing being disposed along a front face of the hub and the hub further includes a wheel assembly that contacts and rolls along the inside surface of the pipe as the internal grinder device travels along the inside surface of the pipe.

26. The method of claim 25, wherein the wheel assembly comprises a plurality of spokes that extend radially outward from the hub with a wheel being disposed at a distal end of each spoke.

27. The method of claim 25, wherein the vacuum module includes a hollow vacuum housing that has an open peripheral vacuum slot that is in fluid communication with the hollow vacuum housing, the vacuum slot facing the inside surface of the pipe.

28. The method of claim 20, further including the step of: adjusting a speed of a motor, that is operated to controllably rotate the hollow housing, to balance torque as the internal grinding device grinds the interior weld joint.

29. The method of claim 28, wherein the speed of the motor is adjusted by:

increasing a speed of the motor until it reaches a target current draw (torque) and subsequently using a control loop to accelerate or decelerate the motor to increase or decrease the torque as the interior weld joint is ground in order to maintain an at least substantially constant torque selected for motor and grinding efficiency.

* * * * *